United States Patent
Richards

Patent Number: 5,958,469
Date of Patent: Sep. 28, 1999

[54] METHOD FOR FABRICATING TOOLS FOR MOLDING DIFFRACTIVE SURFACES ON OPTICAL LENSES

[75] Inventor: David A. Richards, Rochester, N.Y.

[73] Assignee: Eastman Kodak Company, Rochester, N.Y.

[21] Appl. No.: 08/856,294

[22] Filed: May 14, 1997

[51] Int. Cl.⁶ .................................................. B29C 33/38
[52] U.S. Cl. ........................... 425/175; 249/116; 216/24; 216/54; 264/2.5; 427/585; 427/135; 425/808; 425/810
[58] Field of Search ........................... 264/1.1, 2.5, 1.31; 65/102; 425/175, 810, 808, 174.4; 216/24, 54, 67; 249/116; 427/135, 585, 162, 419–7

[56] References Cited

U.S. PATENT DOCUMENTS

| | | | |
|---|---|---|---|
| 4,219,721 | 8/1980 | Kamen et al. | 219/121 LM |
| 4,219,933 | 9/1980 | Kita et al. | 33/19 A |
| 4,842,633 | 6/1989 | Kuribayashi et al. | 65/102 |
| 4,842,782 | 6/1989 | Portney et al. | |
| 5,013,494 | 5/1991 | Kubo et al. | |
| 5,117,306 | 5/1992 | Cohen et al. | 359/565 |
| 5,161,057 | 11/1992 | Johnson | 359/566 |
| 5,389,313 | 2/1995 | Imataki et al. | 264/2.5 |
| 5,436,764 | 7/1995 | Umetani et al. | 264/2.5 |
| 5,443,966 | 8/1995 | Fairweather et al. | 435/69.3 |
| 5,538,674 | 7/1996 | Nisper et al. | 264/1.31 |
| 5,575,962 | 11/1996 | Takahashi | 264/2.5 |
| 5,589,983 | 12/1996 | Meyers et al. | 359/566 |
| 5,728,324 | 3/1998 | Welch et al. | 264/2.5 |
| 5,770,120 | 6/1998 | Kamihara et al. | 264/2.5 |

FOREIGN PATENT DOCUMENTS 0 557 057 A1  8/1993  European Pat. Off. .

OTHER PUBLICATIONS

K. Goto, et al, "Spherical Grating Objective Lenses for Optical Disk Pick–ups " vol. 26 of the Japanese Journal on Applied Physics, 1987.

G.J. Swanson, Binary Optics Technology: The Theory and Design of Multi–Level Diffractive Optical Elements, pp. 17–21 and 41–45.

A.I. Tudorovskii, An Objective with a Phase Plate, pp. 126–133, 1959.

T. Fujita et al, Blazed gratings and Fresnel lenses fabricated by electron–beam lithography, pp. 578–580, 1982.

P.P. Clark et al, Production of Kinoforms by single point diamond machining, pp. 39–40, 1989.

Holographic Systems, Components and Applications, Sep. 16–18 1991, pp. 190–194.

Carmina Londono, et al, Athermalization of a single–components lens with diffractive optics, pp. 2295–2302, 1993.

Michael R. Feldman, Diffractive optics move into the commercial arena, pp. 143–151, 1994.

*Primary Examiner*—Mathieu D. Vargot
*Attorney, Agent, or Firm*—Mark G. Bocchetti

[57] ABSTRACT

A method for producing diffractive optic molding tools with improved durability is accomplished by depositing a layer of chromium carbide on a substrate material. This layer of chromium carbide becomes the receptor for a final machinable coating such as electroless nickel. The pattern for the desired diffractive surface is predetermined and a single-point-diamond turning machine is used to cut the negative of this predetermined pattern into the machinable layer to produce the pattern of concentric zones to the required depths. The pattern is then uniformly etched in the machinable layer down into the intermediate layer of chromium carbide resulting in the complete removal of all of the electroless nickel. In that the etching rates of electroless nickel and chromium carbide differ from one another, it is necessary to dimensionally adjust the negative pattern turned into the electroless nickel surface to allow for the different etch rates. In such manner, an extremely durable molding surface of chromium carbide is achieved.

20 Claims, 2 Drawing Sheets

METHOD FOR FABRICATING TOOLS FOR MOLDING DIFFRACTIVE SURFACES ON OPTICAL LENSES

FIELD OF THE INVENTION

The present invention relates generally to molding optical lenses with diffractive surfaces and, more particularly, to methods for fabricating the molding tools for molding diffractive surfaces on optical lenses.

BACKGROUND OF THE INVENTION

A number of methods are known in the prior art for producing optical lenses with diffractive surfaces. Plastic optics with diffractive surfaces have been generated through diamond turning operations where a diamond tool is used to cut the optical material. This method, or variations thereof, is discussed in European Patent Application 557,057 A1, in an article entitled "Athermalization of a Single-Component Lens with Diffractive Optics" which appeared in the May 1993 issue of Applied Optics, in an article entitled "Coproduction of Kinoforms by Single Point Diamond Machining" which appeared in the December 1989 issue of Optics News and in a paper entitled "Diffractive Optical Elements in Flir" which was presented at the 3rd International Conference on Holographic Systems, Components and Applications in September of 1991.

Another method for producing optical lenses with diffractive surfaces is discussed in a paper entitled "Spherical Grating Objective Lenses for Optical Disk Pick-ups" which appeared in Volume 26 of the Japanese Journal on Applied Physics in 1987. Such article discusses that for the use of a computer and numeric controlled machining technique, blazed grating dyes are generated using diamond turning lathes. These blazed grating dyes are, in turn, used to mold grating collimator lenses through plastic injection molding.

U.S. Pat. No. 5,161,057 to Johnson teaches that a molding tool for molding a fresnel lens which includes a transmission grating used to reduce chromatic aberration wherein the molding tool would typically be formed by a precision turning operation using a straight edge, single-crystal diamond cutter to define the grating facet surfaces.

U.S. Pat. No. 5,589,983 to Meyers et al teaches a method for manufacturing a diffractive surface profile wherein a specific technique for diamond turning the molding elements is taught for injection molding of optical lenses with diffractive surfaces.

The use of diffractive surfaces in optical instruments is growing as is evidenced by the inclusion of the ability to design them in a variety of major commercial design software programs. The utility of diffractive surfaces is greatly enhanced if such surfaces can be produced in high volume. For plastic optics, this is readily achievable with existing technology. By single-point-diamond turning a nickel-coated steel tool, one can use standard plastic injection molding fabrication techniques to produce diffractive-surface parts in high volumes. However, it has been noticed on many occasions that nickel tooling which has been turned for aspheric surfaces is not as robust as the traditional steel tooling for spherical surfaces. This difference in wear and damage potential becomes even greater considering the fine structure required for diffractive surfaces.

SUMMARY OF THE INVENTION

It is, therefore, an object of the present invention to provide a method for producing molding tools for use in the production of diffractive surfaces which have much greater durability.

It is a further object of the present invention to provide a method for producing molding tools for molding diffractive surfaces with very fine structures wherein the molding tools have much improved wear characteristics.

Briefly stated, these and numerous other features, objects and advantages of the present invention will become readily apparent upon a reading of the detailed description, claims and drawings set forth herein. These features, objects and advantages for producing diffractive optic molding tools are accomplished by depositing a layer of chromium carbide on a substrate material. A layer of approximately 2 microns thickness can be deposited by coating techniques such as evaporative deposition, sputtering, or chemical vapor deposition. This layer of chromium carbide becomes the receptor for a final coating of electroless nickel. The layer of electroless nickel is preferably applied by means of a chemical bath. The pattern for the desired diffractive surface must, of course, be predetermined and a single-point-diamond turning machine is used to cut the negative of this predetermined pattern into the electroless nickel to produce the pattern of concentric zones to the required depths. The pattern is then uniformly etched in the electroless nickel down into the intermediate layer of chromium carbide resulting in the complete removal of all of the electroless nickel. This can be done by ion etching as is used in ion milling where the uniformity of the beam is important. In that the etching rates of electroless nickel and chromium carbide differ from one another, it will be necessary to dimensionally adjust the negative pattern turned into the electroless nickel surface to allow for the different etch rates. By way of example, when ion etching a layer of electroless nickel on a substrate of silicon carbide, the ratio of etch rates between the nickel and the silicon carbide is 2 to 1. Thus, the pattern placed in the electroless nickel must be adjusted accordingly.

DETAILED DESCRIPTION OF THE INVENTION

Figure 1:
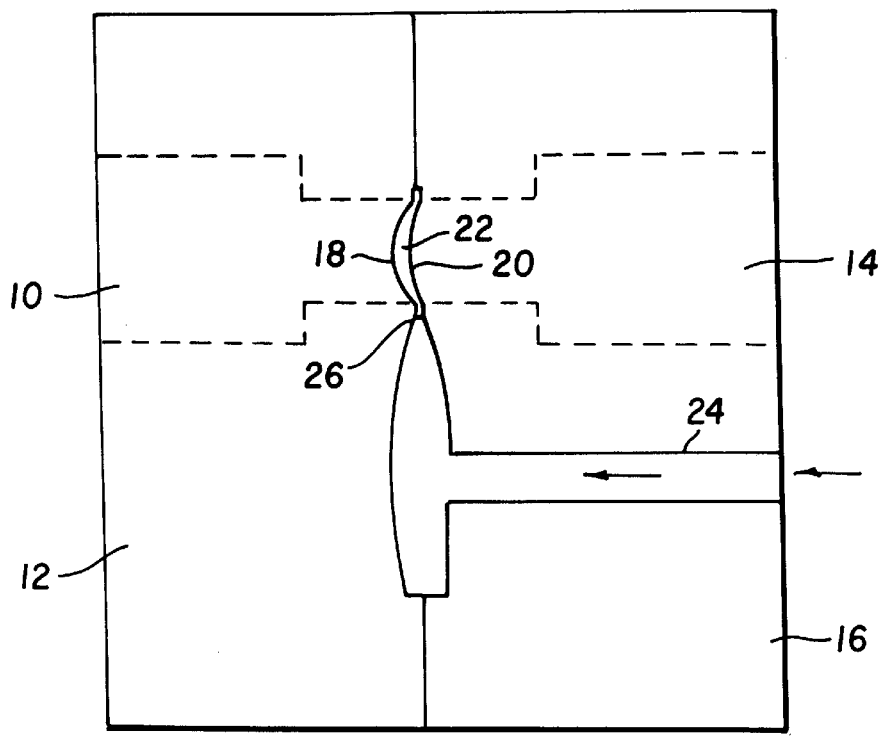
FIG. 1 is a schematic diagram of a typical injection molding apparatus for molding optical elements.

Turning first to FIG. 1, there is shown a schematic view of an exemplary injection mold arrangement for molding optical elements. A first mold insert 10 held in a mold base 12 resides opposite a second mold insert 14 residing in a second mold base 16. As will be apparent to those skilled in the art, plastic injection molded lenses can be of a variety of configurations including plano-plano, plano-convex, plano-concave, convex-convex, concave-concave, and convex-concave. As depicted in FIG. 1, mold insert 10 includes a molding surface 18 for molding a lens with a convex surface while mold insert 14 includes a molding surface 20 configured to mold a lens with a concave surface. Molten optical plastic is delivered to the mold cavity 22 via screw 24 through gate 26.

Figure 2:
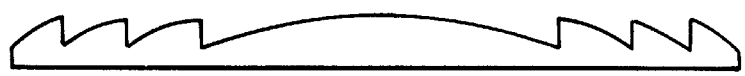
FIG. 2 is a cross sectional view of what may be referred to as a diffractive optical element with a quadratic surface profile.
Figure 3:
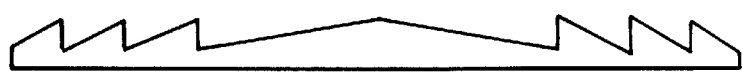
FIG. 3 is a cross sectional view of what may be referred to as a diffractive optical element with a linear surface profile.
Figure 4:
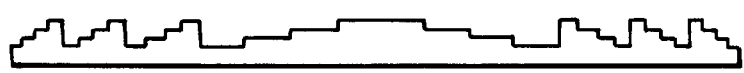
FIG. 4 is a cross sectional view of what may be referred to as a diffractive optical element with a binary stepped surface profile.

The fabrication of optical elements with diffractive pattern formed in the surface thereof is well known. FIGS. 2–4 are cross-sectional views of optical elements with different types of diffractive patterns formed in one surface thereof. The diffractive patterns are, of course, predetermined to fit the needs of the particular element being formed. There are a variety of methods for designing the predetermined pattern of an optical element that are well known in the prior art and as such, will not be discussed herein. The depth of the diffractive pattern to be imparted into the optical element is defined as the wavelength of the light source used in practice (not test) divided by the index of refraction of the molded optical material -1 which stated in equation form reads:

$$\lambda/(n-1)$$

A typical value would therefore be approximately 1 $\mu$m.

Perhaps the most efficient method of mass producing plastic optical elements with diffractive surfaces is through injection molding. In injection molding, it is necessary to produce a mold insert which includes a surface pattern which is the negative of the diffractive surface pattern which is to be imparted to the lens or element molded therewith. The preferred method for forming the negative surface pattern in the mold insert is to mount the mold insert on a diamond turning lathe and machine a negative of the desired diffractive pattern directly into the mold insert. A specific method for diamond turning such mold inserts is taught in U.S. Pat. No. 5,589,983 which is hereby incorporated herein by reference.

Figure 5:
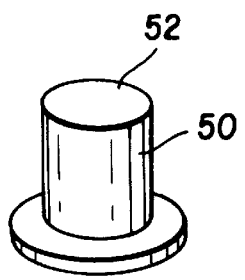
FIG. 5 is a perspective view of a mold insert blank.
Figure 6:
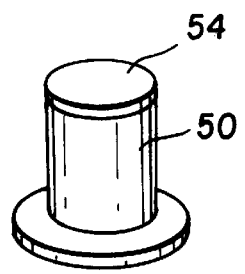
FIG. 6 is a perspective view of a mold insert blank of FIG. 5 with a layer of chromium carbide applied to the top surface thereof.
Figure 7:
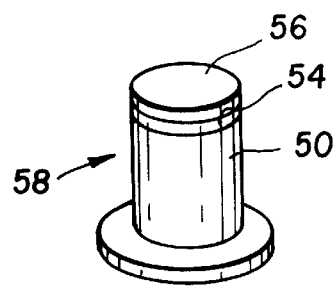
FIG. 7 is a perspective view of a mold insert blank of FIG. 6 with a machinable layer applied to the layer of chromium carbide.

There is shown in FIGS. 5, 6 and 7 the method steps in sequence for producing the improved mold inserts of the present invention. First, a mold insert blank 50 is produced. The materials from which mold insert blank 50 may be produced includes stainless steel, fused silica, alumina and other ceramics, as well as structural glasses. The preferred material is a stainless steel such as Stavax®. Other materials, metals and metal alloys such as TZM, Inconel®, and ceramics can be used with or without the appropriate coating(s). The material used for mold insert blank 50 should be chosen for its durability and release characteristics considering the optical material (e.g. plastic, glass) being molded therewith. In addition, it may be desirable to use materials other than stainless steel when, for example, the coefficient of thermal expansion of another material more closely satisfies the expansion property requirements that will be needed in molding the particular optical element and its specific geometry.

Mold insert blank 50 includes a top surface 52. The top surface 52 is figured to receive the base curve of the optical element to be molded therewith. A layer 54 of chromium carbide is deposited on the prepared top surface 52 of mold insert blank 50 as depicted in FIG. 6. Chromium carbide is chosen because its hardness approximates silicon carbide but its thennal expansion properties closely match those of stainless steel. In such manner, the heating and cooling cycles experienced by the mold inserts during molding operations will not promote delamination of the chromium carbide layer 54 from the mold insert blank 50. Layer 54 is approximately 2 microns in thickness. Layer 54 may be deposited by various methods including evaporative deposition or sputtering. Layer 54 of chromium carbide becomes the receptor for a final machinable coating 56 which is preferably electroless nickel (see FIG. 7).

Figure 8:
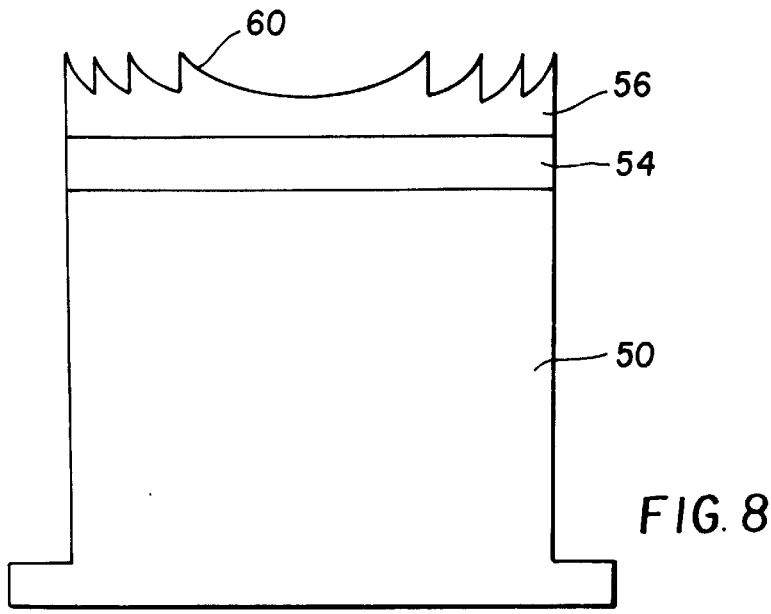
FIG. 8 is a cross sectional view of a mold insert with a predetermined pattern machined into the machinable layer.
Figure 9:
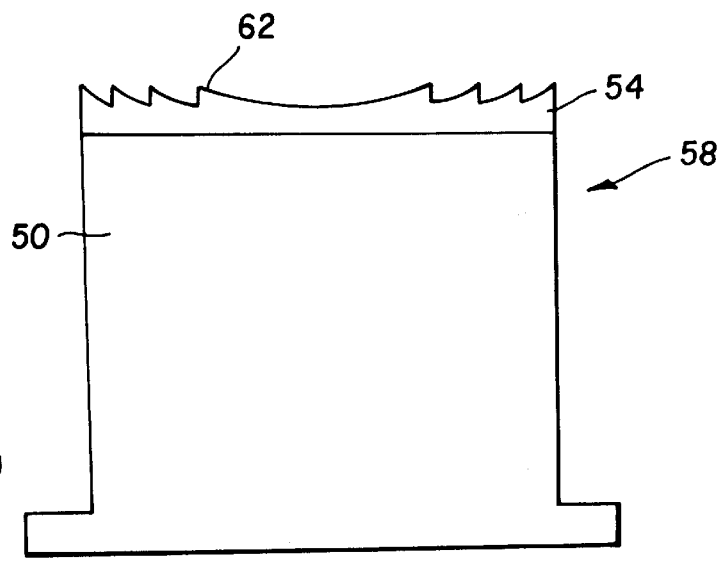
FIG. 9 is a cross sectional view of the mold insert of FIG. 8 with a negative of a predetermined diffractive pattern etched into the chromium carbide layer by etching away completely the machinable layer.

As mentioned above, mold insert 58 to be complete must include a predetermined pattern which is the negative of the diffractive pattern desired for the optical element to be formed therewith. The pattern data is converted into turning machine demands and a single-point-diamond turning machine is used to machine into the electroless nickel layer 56 to thereby produce the desired pattern of concentric zone to the depths required by the predetermined pattern. Once the electroless nickel layer 56 has been machined, the next step of the process of the present invention is to uniformly etch the pattern machined into the nickel layer 56 down into the intermediate layer 54 of chromium carbide. During this etching step the entire layer 56 of electroless nickel is removed. Etching can be accomplished by ion etching as used in ion milling where the uniformity of the beam is important. Because chromium carbide etches at a different rate than electroless nickel, it is necessary to adjust the geometry of the pattern machined into the electroless nickel. Those skilled in the art will also appreciate that etch rate is a function not just of the material, but also of angle. Thus, the pattern machined into layer 56 is not the negative of the pattern to be molded into an optical element using the mold insert 58. Rather, it is the pattern which, through etching will produce the predetermined negative pattern in the chromium carbide layer 54. An example of the effect of different etch rates is represented in FIGS. 8 and 9. As can be seen in FIG. 8, a predetermined pattern 60 has been machined into machinable layer 56. Once the machinable layer 56 has been etched away, as depicted in FIG. 9, the layer chromium carbide 54 has been etched with a negative 62 of the desired diffractive pattern.

Although single-point-diamond turning has a limit to its resolution for any given machine which is usually less than that achievable with mask/photo resist techniques, the choice of technique is suggested by any given design. The fineness of the outer zone is defined by the numerical aperture of the desired optical surface. For curved surfaces turning is preferred to masking techniques. However, etching must be calibrated for curved surfaces because etch rates are a function of angle. Masks can be generated with x-y or r-θ writers. So called blazed surfaces are more readily generated with turning although multiple masking can produce good approximations of this, but with more difficulty in alignment.

Through the practice and method of the present invention, mold inserts are produced for producing optical elements with diffractive surfaces where the mold surface of the mold insert 58 is chromium carbide. Mold surfaces of chromium carbide will be substantially more durable and less susceptible to wear and damage than the mold surfaces of prior art mold inserts. In such manner, mold insert life will be significantly increased. It is believed that the mold inserts 58 of the present invention will have a life expectancy of at least two times that of a nickel on steel mold insert.

In an alternative method for generating the improved mold insert 58 of the present invention, instead of using electroless nickel for machinable coating 56, a photoresist can be used for machinable coating 56. However, the photoresist is not being used in the manner that photoresists are typically used. As used in the practice of the present invention, the photoresist is employed only as a machinable coating 56. No imaging is performed with the photoresist. For that reason, the photoresist must have a specific characteristic which is not typical of all photoresists. The photoresist must plate out uniformly on substrates having curved surfaces and/or uneven surfaces. A particular photoresist which can be used for machinable coating 56 is Eagle 2100 ED as manufactured by Shipley Company, Inc. of Newton, Mass. This particular photoresist is cataphoretically deposited onto electrically conductive surfaces regardless of shape or geometric complexity. As with the coating 56 of electroless nickel, the pattern is machined into the coating 56 of photoresist using a single-point-diamond turning machine to thereby produce the desired pattern of concentric zone to the depths required by the predetermined pattern. Once the layer 56 photoresist has been machined, the next step of the process is to uniformly etch the pattern machined into the photoresist layer 56 down into the intermediate layer 54 of chromium carbide. During this etching step the entire layer 56 of photoresist is removed. Etching can be accomplished by ion etching as used in ion milling where the uniformity of the beam is important. Because chromium carbide etches at a different rate than the photoresist, it is necessary to adjust the geometry of the pattern machined into the photoresist. As mentioned above with regard to electroless nickel, those skilled in the art will also appreciate that etch rate is a function not just of the material, but also of angle. Thus, the pattern machined into layer 56 is not the negative of the pattern to be molded into an optical element using the mold insert 58. Rather, it is the pattern which, through etching will produce the predetermined negative pattern in the chromium carbide layer 54.

It will be appreciated by those skilled in the art that although the mold insert 58 is discussed with particular reference to a diffractive pattern to be molded therewith, the method of the present invention can be used to produce molds without diffractive patterns. For example, the method of the present invention can be used to produce molds for molding optical elements with aspherical geometry.

From the foregoing, it will be seen that this invention is one well adapted to attain all of the ends and objects hereinabove set forth together with other advantages which are apparent and which are inherent to the process.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

What is claimed is:

1. A method for making a molding tool for molding optical elements comprising the steps of:

(a) selecting a material having known thermal expansion properties;

(b) producing a mold insert blank with a top surface, the mold insert blank being produced from the material of said selecting step;

(c) depositing a layer of chromium carbide on the top surface, the layer of chomium carbide having thermal expansion properties which closely match the known thermal expansion properties of the material of said selecting step;

(d) coating the layer of chromium carbide with a machinable layer;

(e) machining a first predetermined pattern into the machinable layer; and (f) etching away completely the machinable layer to produce a second predetermined pattern in the layer of chromium carbide.

2. A method as recited in claim 1 wherein:

said machining step is performed by single-point-diamond turning.

3. A method for making a molding tool for molding optical elements comprising the steps of:

(a) selecting a material having known thermal expansion properties;

(b) producing a mold insert blank with a top surface, the mold insert blank being produced from the material of said selecting step;

(c) depositing a uniform layer of chromium carbide on the top surface, the layer of chomium carbide having thermal expansion properties which closely match the known thermal expansion properties of the material of said selecting step;

(d) coating the layer of chromium carbide with a machinable layer;

(e) machining a first predetermined pattern into the machinable layer; and (f) etching away completely the machinable layer to produce a predetermined diffractive pattern in the layer of chromium carbide.

4. A method as recited in claim 1 wherein:

said coating step is performed with electroless nickel.

5. A method as recited in claim 1 wherein:

said coating step is performed with a photoresist.

6. A method as recited in claim 3 wherein:

said coating step is performed with electroless nickel.

7. A method as recited in claim 3 wherein:

said coating step is performed with a photoresist.

8. A method as recited in claim 3 wherein:

said machining step is performed by single-point-diamond-turning.

9. A method for making a molding tool for molding diffractive plastic surfaces comprising the steps of:

(a) selecting a material having known thermal expansion properties;

(b) producing a mold insert blank with a top surface, the mold insert blank being produced from the material of said selecting step;

(c) depositing a layer of chromium carbide on the top surface, the layer of chomium carbide having thermal expansion properties which closely match the known thermal expansion properties of the material of said selecting step;

(d) coating the layer of chromium carbide with a machinable layer;

(e) matching a first predetermined pattern into the machinable layer; and (f) producing a negative of a desired diffractive pattern in the layer of chromium carbide by etching away completely the machinable layer.

10. A molding tool for molding optical elements comprising:

(a) a mold insert blank having a top surface, said mold insert blank being fabricated from a material having known thermal expansion properties;

(b) a layer of chromium carbide residing on said top surface, said layer of chromium carbide having a predetermined pattern formed therein by etching away completely a machinable layer, said layer of chomium carbide having thermal expansion properties which closely match the known thermal expansion properties of said material.

11. A molding tool for molding diffractive plastic surfaces comprising:

(a) a mold insert blank having a top surface said mold insert blank being fabricated from a material having known thermal expansion properties;

(b) a layer of chromium carbide residing on said top surface, said layer of chromium carbide having a negative of a predetermined diffractive pattern formed therein by etching away completely a machinable layer which had been applied to the layer chromium carbide, said layer of chomium carbide having thermal expansion properties which closely match the known thermal expansion properties of said material.

12. A method as recited in claim 1 wherein:
the material selected is a stainless steel.

13. A method as recited in claim 12 wherein:
said depositing step is performed by vapor deposition.

14. A method as recited in claim 13 wherein:
said depositing step is performed by sputtering.

15. A method as recited in claim 3 wherein:
said depositing step is performed by vapor deposition.

16. A method as recited in claim 3 wherein:
said depositing step is performed by sputtering.

17. A molding tool as recited in claim 10 wherein:
said material is a stainless material.

18. A molding tool as recited in claim 11 wherein:
said material is a stainless material.

19. A molding tool as recited in claim 10 wherein:
said chomium carbide layer has been formed by sputtering.

20. A molding tool as recited in claim 10 wherein:
said chomium carbide layer has been formed by vapor deposition.

* * * * *